United States Patent Office 3,804,937
Patented Apr. 16, 1974

3,804,937
PROCESS FOR PRODUCING AN OPAQUE INORGANIC-ORGANO TITANATE POLYMERIC FILM
Horton H. Morris and Paul I. Prescott, Macon, Ga., assignors to Freeport Minerals Company, New York, N.Y.
No Drawing. Original application Oct. 30, 1969, Ser. No. 872,757, now Patent. No. 3,697,475. Divided and this application May 18, 1972, Ser. No. 254,803
Int. Cl. B29d 7/24; D01f 1/02
U.S. Cl. 264—211      3 Claims

ABSTRACT OF THE DISCLOSURE

Oriented opaque ultrathin films comprising thermoplastic polymers containing up to about 60 parts by weight of an inorganic filler-organo titanate compound are prepared by extruding the compositions as films and thereafter drawing the resultant films at a temperature below that at which the films remain translucent. The films of our invention are useful as packaging material in preparing ultrathin paper, and in laminates, non-woven fabric, rug backing and mesh structures.

This is a division, of application Ser. No. 872,757, filed Oct. 30, 1969 and now issued as U.S. Pat. 3,697,475.

BACKGROUND OF THE INVENTION (a) Field of the invention

This invention relates to a process for producing thin oriented opaque films of the thermoplastic polymers. More particularly, the invention relates to opaque films comprising thermoplastic polymers which have been modified by the incorporation therein of an inorganic filler, the surface of which has been reacted with an organic derivative of ortho titanic acid containing at least two hydrolyzable groups, and which have been oriented under conditions which produce a white, opaque film of high brightness and tensile strength.

(b) Description of the prior art

Paper has been made conventionally by felting naturally occurring cellulosic fibes such as cotton and wood. To produce cellulosic paper of publication grade, it is frequently the practice to fill the body stock, i.e., the raw uncoated paper from the felting and subsequent drying and smoothing operations, with an inert, white mineral filler and to coat both sides of the body stock with a high brightness white pigment, e.g., kaolin clays, in a binder of casein latex, starch or other adhesives to achieve a sheet opacity of at least 88 to 90% and a TAPPI brightness of 70%. The resulting publication grade paper stock has a weight of 34 to 45 pounds per ream, a thickness of 3 to 4 mils, uncalendered, and a tensile strength of 3000 to 5000 p.s.i. for uncoated stock.

OBJECTS OF THE INVENTION

One object of this invention is to produce thermoplastic films suitable as a replacement for paper having high opacity, brightness and tensile strength and low weight.
A further object of this invention is to provide thermoplastic films suitable as a replacement for paper which contain from about 2 to about 60 percent of a treated inorganic filler in a thermoplastic material.

Still another object is to provide colored thermoplastic films suitable as a replacement for paper.
Yet another object of the invention is to provide fibrillated filled films.

SUMMARY OF THE INVENTION

These and other objects are attained by incorporating into a thermoplastic material an inorganic filler which has been reacted with an organic derivative of ortho titanic acid containing at least two hydrolyzable groups, forming films therefrom and cold drawing the films under conditions which produce a white, opaque film of high brightness and tensile strength. To obtain colored films, inorganic pigments conventionally used as coloring agents, which have been reacted with an organo titanium compound containing at least two hydrolyzable groups are used or may be included with other organo titanium treated inorganic fillers. Alternatively, organic dyes may be incorporated in the organo titanium compound which is reacted with the filler.

The organo titanium compounds used to react with the inorganic filler material are represented by the formula $Ti(OR)_m R'_{4-m}$ wherein R is a hydrocarbon radical containing from 1 to 12 carbon atoms and R' may be OCOR'', OR'' or a hydrocarbon substituted silicic acid radical $(OSiR_3'')$ wherein R'' is a substituted or unsubstituted hydrocarbon radical having from 1 to 40 carbon atoms and wherein R''' is a substituted or unsubstituted hydrocarbon radical having from 6 to 40 carbon atoms providing that R''' and R are not identical. In the formula m is equal to 2 or 3. At least two hydrolyzable groups, preferably OR groupings, must be present in the organo titanium compound in order that hydrolysis of the organo titanium compound occurs followed by its polymerization to produce a film of organo-substituted titanium oxide at the filler surface. Through this reaction the filler is provided with a hydrophobic, organophilic film.

The organo titanium compounds can be prepared by reacting 1 mol of $Ti(CR)_4$ with from 1 to 2 mols of a compound represented by the formula AR' wherein A is hydrogen or a group capable of reacting to remove an OR from the $Ti(OR)_4$ molecule and R' is as described above. A mixture of two or more compounds of the formula AR' may be used. The preparation of illustrative organo titanium compounds is more particularly described in U.S. Pat. Langkammerer's 2,621,193, page 15 of the E. I. Du Pont de Nemours & Co. publication entitled "Tyzor," Versatile Chemicals For Industry (1965, revised 1966) which describes the reaction product of Langkammerer's process as a monomer whose formula is identical to the $Ti(OR)_m R'_{4-m}$ formula given above, but which also points out that the monomers are unstable and under certain conditions may decompose by reacting with one another to yield a polymeric reaction product of a structure identical to that shown in col. 4, lines 51–58 of the Langkammerer patent; as pointed out by Langkammerer (col. 4, lines 40–42), the extract structure of this polymeric reaction product is unknown.

Reverting to the starting material $Ti(OR)_4$, R may be selected from the group consisting of alkyl, cycloalkyl, aryl, aralkyl, and alkaryl radicals containing from 1 to 12 carbon atoms. Specific examples of compounds represented by the formula are tetramethyl titanate, tetraethyl titanate (ethyl orthotitanate), tetrabutyl, tetraisopropyl, tetraamyl, tetraoctyl, tetradodecyl, tetra-2-ethyl-hexyl, tetrabenzyl, tetraphenyl and tetra-betanaphthyl titanates.

The radical R" mentioned above represents a hydrocarbon radical having from 1 to 40 carbon atoms taken from the group consisting of alkyl, cycloalkyl, aryl, aralkyl, alkaryl hydrocarbon radicals which may contain various substituents such as halogens, e.g., a perfluoro methyl radical, hydroxyl groups, keto group (radical of levulinic acid) amino, nitro and heterocyclic groups. Examples of R" groups are methyl, ethyl, propyl, butyl, isobutyl, pentyl, hexyl, heptyl, octyl, octadecyl, cyclohexyl, cycloheptyl, phenyl, naphthyl, tolyl, xylyl, benzyl, phenyl ethyl, chlorophenyl, dibromophenyl, 2,3-dihydroxy propoxy. The various hydrocarbon radicals may contain aliphatic unsaturation as well as aromatic unsaturation. Perfluoro compounds may be used. R''' is of similar scope but with exclusion of radicals containing 5 or less carbon atoms.

A preferred class of compounds represented by the formula AR' are the organic aromatic and aliphatic carboxylic acids. The resulting organo titanium compound may be called an ester carboxylate or an ester anhydride of ortho titanic acid. Among the aliphatic and aromatic organic acids that may be used are straight or branch chain, saturated or unsaturated, substituted or unsubstituted mono- or poly-carboxylic acids including such acids as stearic, palmitic, ricinoleic, linoleic, lauric, myristic, oleic, benzoic, caproic, caprylic, nonylic, capric, linseed oil acids, castor oil acids, tall oil acids, cocoanut oil acids, soy-bean oil acids, tung oil acids, perfluorooctanoic acid, phthalic acid, adipic acid, etc.

A second class of useful compounds which generally will be used in conjunction with one of the acids cited above, although they can be used as sole component of the reaction with the $Ti(OR)_4$ are the organic alcohols or organic phenols. Among such compounds are 2-phenoxyethanol, m-cresol, diethylene glycol, 2,6-dioctadecyl cresol, 1-(2-pyridylazo)-2-naphthol, naphthol, anisyl alcohol, glycerol, geraniol, etc.

In some cases the combined effect of the two classes just cited may be obtained by using an ester such as the triglyceride of ricinoleic acid.

The inorganic fillers of this invention comprise fillers in particulate (of any particle size distribution and any particle shape) or fibrous form. As long as the inorganic filler contains at its surface reactive hydroxy groups and/or about 0.1 to about 2 weight percent based on the filler of adsorbed water, the specific chemical nature of the filler is not important. Suitable inorganic fillers include clay, calcium carbonate, barium sulfate, glass in the form of fibers or thin platelets, vermiculite, asbestos, mica, etc. If a colored product is desired any of the well-known inorganic coloring pigments may be used including iron oxides, Prussian blue, zinc chromate, cobalt blue, ultramarine blue, etc. All of these materials generally have the property of being chemically inert to the polymeric materials and are relatively heat resistant as compared to the polymeric material.

Clays are a preferred inorganic filler because of the superior properties of the treated clay of our invention in comparison with the untreated clay, the ready availability of clays and their relatively low cost. Illustrative clays are untreated or treated (e.g., calcined or delaminated) English or Georgia filler and coating clays. Clays are composed of two atomic lattice structural units. One consists of two sheets of closely packed oxygen atoms or hydroxyl groups in which aluminum (and occasionally iron or magnesium) atoms are embedded in octahedral coordination. The second unit is built of silica tetrahedrons, being arranged so as to form a hexagonal network, which is repeated indefinitely to form a sheet-like structure. In kaolinite, the structure is composed of a single tetrahedral sheet and a single aluminum octahedral sheet combined in a unit so that the tips of the silica tetrahedrons and one of the layers of the octahedral sheet form a common layer. The aluminum sheet, in a unit cell, carriers six hydroxyl groups, which appear on one surface of the cell and two hydroxyl groups which project toward the center of the cell. The structural formula can be represented by $(OH)_8Si_4Al_4O_{10}$. Clay minerals therefore contain hydroxyl groups which can be pictured as potential reaction sites. Clay minerals are also very finely divided and have surface areas varying from about one square meter per gram up into the 100 square meter per gram range. Like all finely divided and fibrous materials water is generally adsorbed onto the clay particles in very small amounts and can serve as a reaction site.

The inorganic filler-organo titanate products are formed by dissolving the organo titanate in an anhydrous organic solvent, wetting the surface of the inorganic filler with the solution and maintaining contact between the two materials until reaction is completed. Generally the reaction occurs spontaneously but, in some cases, gentle heating is required to speed the reaction. The solvent and hydrolysis products are then removed by distillation or filtration. As a result of this treatment it is believed an extremely thin layer of an organic substituted titanium compound or hydrated titanium oxide is formed by hydrolysis of the titanium compound on the surface of the inorganic material, due to the presence of hydroxyl groups in the inorganic filler, e.g., in conventional clays, or due to the presence of a trace of adsorbed water. Whatever the mechanism the product is stable to further processing conditions.

The amount of organo titanate, $Ti(OR)_mR'_{4-m}$, used will vary from about 0.5 to about 6 weight percent based on the dry weight of the inorganic material, the amount used being partially dependent on the surface area of the inorganic material since it is essential that substantially all of the surface area be reacted. The organo titanate should be dissolved in a solvent which does not react with the titanate. Such solvents are hydrocarbons such as naphtha, hexane, octanes, etc. and chlorinated hydrocarbons such as trichloroethylene. The solvents should be anhydrous. In the event that the organotitanium compound is volatile the inorganic material may be directly reacted with it by passing the gaseous material across the inorganic surfaces. The volatile organo titanate may be diluted with a dry inert gas to facilitate this process. If the inorganic material lacks reactive hydroxyl groups at its surface and has been subjected to severe drying conditions, it will be necessary to mix it with water such that its surface contains from about 0.1 to about 2 weight percent of water prior to the reaction with the organo titanate.

The particle size and shape of the inorganic material is important only with respect to the end use of the filled polymeric composition. Thus, a very fine particle size may be desired when the polymer composition is drawn to produce films of 0.5 mil thickness.

The inorganic filler-organo titanate products used in the invention are set out and claimed in the commonly assigned application of Horton H. Morris and J. P. Olivier, viz., Ser. No. 872,730, filed Oct. 30, 1969, now issued as U.S. Pat. 3,660,134.

The thermoplastic polymers of our invention cover a variety of types. Any thermoplastic polymer can be used, the term thermoplastic as used in our application applies to synthetic resins that may be softened by heat, and then regain their original properties upon cooling. It is not intended that the polymer be void of any crosslinking. For example, impact polystyrenes which contain crosslinked rubber can be used.

An important class of polymers are those obtained by polymerizing or copolymerizing organic compounds containing a carbon-carbon double bond. Such polymers include the polyalkenes formed from monomers such as ethylene, propylene, butylene and isobutylene; the polydialkenes formed from monomers such as butadiene and isoprene; the halogenated polyalkenes from monomers such as dichlorodifluoroethylene, brominated ethylenes, tetrachloroethylene, chlorotrifluoroethylene, and tetrafluoroethylene; the vinyl resins such as polyvinyl acetal, polyvinyl acetate, polyvinyl alcohol, polyvinyl butyral, polyvinyl formal, polyvinyl carbazone, polyvinyl chloride and polyvinylidene chloride; the polystyrenes formed from such monomers as butadiene, substituted butadienes as isoprene, styrene, alpha-methyl styrene and the chlorostyrenes; and acrylic resins formed from such monomers as acrylic acid, methacrylic acid and the esters and nitriles thereof such as methyl acrylate, ethyl acrylate, methylmethacrylate, acrylonitrile and methacrylonitrile. Another related group of resins include the copolymers and terpolymers of the preceding monomers. Examples are copolymerized butadiene-styrene, vinyl chloride-vinyl acetate, vinyl chloride-vinyloxyethanol and ethylene-maleic anhydride.

An additional class of thermoplastic polymers are condensation polymers such as the nylons and polyurethanes. Preferred polymers are those synthetic polymers of monoethylenically unsaturated monomers containing two to six carbon atoms and especially those polymers and copolymers of ethylene or propylene and other monoethylenicaly unsaturated monomers. Polymeric compositions useful in this invention are included among the polymeric compositions disclosed in the commonly assigned application of Horton H. Morris, J. P. Olivier and P. I. Prescott, viz., Ser. No. 872,752, filed Oct. 30, 1969, now issued as U.S. Pat. 3,697,474.

The compositions of this invention are prepared by simply mixing the polymeric material with the treated filler using any of the conventional means common to the plastics industry. Thus, the polymer may be mixed on roll mills at elevated temperatures until soft and the dried filler added during the milling action. Alternatively, the polymer and filler may be mixed together in ball mills, dough mixers with or without added solvent and other conventional additives such as plasticizers, antioxidants, lubricants, dyes, etc. Thereafter, the compositions are extruded in conventional apparatus at elevated temperatures to form films having any desired thickness. These films then may be reduced in thickness in two steps, the first occurring immediately after the film emerges from the extruder before it is quenched on the chill rolls adn the second occurring after the film has cooled substantially below 100° C. In the first reduction in thickness of the film, the film remains translucent. In the second step, the thickness of the film is further reduced and becomes white and opaque. For example, in the first reduction the film thickness can be reduced to 1.5 to 5 mils while in the second step, the film can be further reduced to 0.5 to 1.5 mils. However, the opaque films of our invention may have a thickness of as much as 5 mils. The opacity of our films is due to the production of a multitude of tiny voids produced during the cold drawing step. Such films are in contrast to the compositions disclosed in the commonly assigned application of Morris, Olivier and Prescott referred to above. In that application, any films produced from the compositions have comparatively few voids in comparison to the films of our invention.

The second step, which can be termed the orienting operation (although orientation does occur in the first reduction), may be performed on conventional apparatus or by hand. Alternatively, the compositions may be merely conventionally drawn and oriented at a conventional temperature, for the first drawing step, to directly produce a translucent drawn film, followed by drawing said film at a temperature below that temperature at which the film remains translucent to produce an opaque film of about 0.5 to about 1.5 mil thickness.

The temperature of the drawing steps will depend on the particular polymer being usid. The first drawing step is carried out at temperatures that produce a translucent material. The second step may be carried out at temperatures from room temperature, i.e., 20–30° C. up to the temperature at which opacity fails to appear. In general, the temperature for the second step should not be above 100° C. although some polymer compositions might be drawn at slightly higher temperatures and still yield an opaque product.

The films of this invention can have a 7 to 16 pound weight per ream per mil of thickness, or can be made as low as 7 to 8 pounds per ream. They have been prepared in thicknesses ranging from 0.5 to 1.5 mils depending on the thickness of the undrawn film and on the temperature at which the film is drawn. The brightness of the films is at least 70% and can be improved to about 97% as measured on an automatic color brightness tester (Martin Sweets Company). The films have a tensile strength of 25,000 to 27,000 p.s.i. which is far above that of conventional cellulosic paper. They are thus stronger, thinner and lower in weight than cellulosic paper, whiter than conventional publication paper and even in the 0.5 mil thickness can have the same opacity. The films have a glossy surface.

The films of the invention which can be called "ultrathin paper" are particularly valuable as publication paper since their low weight will reduce postal rates and their thinner sheets will reduce bulk. The films are also useful in other applications where high strength, opacity and thinness are desirable such as in top liners for paperboard, bread wrappers, plastic bags for packaging or garbage disposal and other wrapping, covering or containing uses. They may also be further modified, as by surface oxidation, to improve their receptivity.

The films of the invention may also be used in capacitors. A perennial problem with capacitors is the degradation of the chlorinated organic dielectric fluid. The degradation products are the cause of premature capacitor failure which may be prevented or at least delayed by using a plastic film containing a filler active sites which will serve to scavenge the degradation products. The organo substituted titanate treated clays in the ultrathin paper will remove impurities and the paper because of its open surface structure will tend to promote migration of the dielectric fluid.

The films of the invention can also be machine fibrillated to produce an open net-like structure. The edges of the fibrillated film have tiny fibrils which act to hold a chopped staple, made from the fibrillated film, when made into a non-woven sheet. The fibrillated film may be used in laminates, non-woven fabric, rug backing and other applications where the mesh structure is filled, coated or impregnated.

The following examples are given in illustration and are not intended as limitations on the scope of this invention. All parts and percentages are by weight unless otherwise stated.

EXAMPLE I (a) Triisopropyl monooleic titanate was prepared by mixing 258 grams (0.91 mole) of tetraisopropyl titanate with 256 grams (0.91 mole) of oleic acid at room temperature accompanied by stirring. The mixture became warm immediately indicating the occurrence of the desired reaction, and was allowed to stand for several minutes. The product was triisopropyl monooleyl titanate dissolved in isopropyl alcohol. Without removing the alcohol the product was mixed with 50 pounds of naphtha to produce a low viscosity solution containing the titanate. Thereafter thirty pounds of a fine particle size delaminated kaolin was added slowly to the naphtha solution accompanied by vigorous stirring to prevent lumping of the clay. After complete addition of the clay to give a 38% solids dispersion in naphtha, the mixture was stirred for an additional half hour. The dispersion was then dried to remove naphtha and isopropyl alcohol and the product therefrom was pulverized. The product did not appear, on visual examination, to be any different from the original kaolin.

To determine the effect of the treatment of the clay with the organo titanium derivative 3 grams of the OX–1 and 3 grams of the untreated kaolin were separately shaken vigorously with 15 grams of water in a test tube. The tubes were then allowed to stand until the kaolin either settled to the bottom or floated on the surface of the water. The amount of OX-1 which settled out, as determined gravimetrically, was less than 0.1 percent showing that OX-1 was hydrophobic whereas all of the untreated kaolin was wetted by the water within 10 seconds of the standing period. When the OX-1 was added to an organic solvent such as toluene, it dispersed therein readily and completely in contrast to the untreated clay which balls or gums up in toluene.

(b) Three hundred and fifty grams of polypropylene having a melt index of 15 grams per 10 minutes at 230° C. were banded on a rubber mill between rolls heated to 360° F. and mixed thereon for about 15 minutes. One hundred and fifty grams of OX-1 were then slowly added and milling was continued for another 15 minutes. The composition thus formed was removed from the rubber mill, cooled and granulated. The composition did not stick to the hot rolls and was easily removed therefrom. To insure complete dispersion of the OX-1 in the polypropylene the composition was pelletized by passing it through an extruder equipped with one 40 mesh and one 250 mesh screen at a temperature of 260° C. into a cold water quench bath using a die which produced a ⅛ inch rod. The cooled rod was then pelletized and dried in a vacuum oven at 100° C. The pellets were then extruded through a slit die adjusted to produce a 5 mil film. The feed zone and the metering zone on the screw were heated to 245° C. and the die was maintained at 238° C. The film was extruded at a constant rate onto a cold quench roll revolving at a controlled circumferential speed. By changing the circumferential speed from 7 to 11 and then to 16 feet per minute films were produced having thicknesses of 3, 2 and 1 mil respectively. The films thus produced contained 30 weight percent of treated clay, and were slightly yellow and translucent.

The 1, 2 and 3 mil films were oriented at a temperature of about 23° C. to produce white opaque thin sheets, having the properties shown in Table I as compared to the properties of the undrawn film.

TABLE I

| Measurement | Undrawn film | Drawn film |
|---|---|---|
| Brightness, TAPPI percent | 29.5 | 93.7–97.7 |
| Opacity, percent | 44.4 | 89.7 |
| Dominant wavelength, mu | | 574.6 |
| Color purity, percent | | 4.05 |
| Visual efficiency, percent | | 91.2 |
| Brightness, percent | | 86 |
| Tensile strength, p.s.i | | 25,000 |

In Table I the TAPPI brightness was measured using the "automatic color brightness tester" marketed by the Martin Sweets Company. The estimated TAPPI brightness was obtained from the color purity and visual efficiency.

All of the cold drawn films had a paper-like feel and gave a crinkle similar to fine papers. When the 3 mil film was drawn at 120° C. under a load of 6 pounds to produce an 0.85 mil film the resultant film was still translucent.

EXAMPLE II

Using the same technique shown in Example I(b) and the same polypropylene, 3 mil films were prepared containing 10, 20 and 30 weight percent OX-1. The films were then machine drawn at a 9 X ratio at an oven temperature which was set at 135° C. to give white opaque films. (The oven was 10 feet long and the film was drawn after it had gone only one foot into the oven. The entry speed of the film into the oven was about 20 feet per minute. The exit speed of the oriented film was 190 feet per minute.) Part of the composition containing 30% OX-1 was fibrillated as it was drawn and had a net-like structure. Scanning electron microphotographs show that the cut edges of the fibrillated film contain discrete fibrils.

EXAMPLE III

Two compositions were made from a polypropylene having a melt index of 6.5 grams per ten minutes at 230° C., one containing 20 and the other 30 weight percent of OX-1. The compositions were extruded, as shown in Example I(b) for production of translucent films, to obtain a 5 mil, slightly yellow and translucent film. When this film was hand drawn at room temperature ca. 20–30° C., it became white and opaque and had a tensile strength of 25,000–27,000 p.s.i.

EXAMPLE IV

To obtain colored ultrathin paper three different inorganic pigments were reacted with the reaction product of tetraisopropyl titanate and oleic acid in the same manner as the clay was reacted in Example I(a). Thirty grams of each treated pigment were added to a polypropylene having a melt index of 4.0 grams per 10 minutes at 230° C. on mill rolls and then 70 grams of OX-1 were added. The compositions thus produced were extruded into thin films and the resultant films cold drawn at about 23° C. to yield colored opaque 1.5 mil film. The first pigment used was a synthetic iron oxide known as Mapico Yellow Lemon of Columbian Carbon Company. The film prepared using this pigment was yellow-orange in color. When a zinc chromate known as C.P. Zinc Yellow Imperial Color and Chemical (Hercules Powder Co.) was used the final film was a bright pastel yellow and when a basic lead chromate deposited on a silica core known as Oncor M 50 of the National Lead Co. was used the final film was a light pinkish orange.

EXAMPLE V

Four hundred grams of polyethylene having a melt index of 2 grams per minute at 125° C. were bonded on a rubber mill between rolls heated to 115° C. and mixed thereon for about 10 minutes. One hundred grams of OX-1 were slowly added and milling was continued for another 15 minutes. The composition thus formed was removed from the rubber mill, cooled and granulated. The granulated composition was pressed between platens heated to 120° C. to produce a 6 mil thick film. The film was translucent as pressed. However, when the film was drawn, by hand, at room temperature (23° C.) it became white, opaque and 2.5 mil thick.

It is obvious that many variations may be made in this invention without departing from the spirit and scope thereof as defined in the appended claims.

What is claimed is:

1. A process for producing an opaque and glossy film having an open surface structure which comprises drawing a polymeric composition at a temperature which produces a translucent film and thereafter drawing said translucent film at a temperature below that at which the film remains translucent to thereby produce said opaque film, said polymeric composition comprising a thermoplastic polymer having incorporated therein an inorganic filler the surface of which, prior to the incorporation step, have been reacted with an organo titanium compound containing at least two hydrolyzable groups and which is represented by the formula $Ti(OR)_m R'_{4-m}$ wherein R is a hydrocarbon radical containing from 1 to 12 carbon atoms and R' is $OCOR''$, $OR'''$, or $OSiR_3''$ wherein R'' is a substituted or unsubstituted hydrocarbon radical having from 1 to 40 carbon atoms and wherein R''' is a substituted or unsubstituted hydrocarbon radical having from 6 to 40 carbon atoms providing that R''' and R are not identical and wherein $m$ is equal to 2 or 3, and wherein said inorganic filler prior to reaction with said organo titanium compound contains at its surface either adsorbed water, in an amount ranging from about 0.1 to about 2 percent, weight percent based on the filler, or reactive hydroxy groups or both reactive hydroxyl groups and said adsorbed water, whereby the hydrolyzable groups of said organo titanium compound are hydrolyzed by said adsorbed water or reactive hydroxyl groups, or both, to produce a polymeric organo titanium compound at the surfaces of said inorganic filler.

2. A process as in claim 1 wherein the second drawing process is carried out at temperatures of from 20 to 100°C.

3. A process according to claim 1 wherein the film is fibrillated during the final drawing step.

References Cited

UNITED STATES PATENTS

| | | | |
|---|---|---|---|
| 2,518,193 | 8/1950 | Signaigo | 260—913 VA |
| 2,941,895 | 6/1960 | Haslam | 106—193 J |
| 3,154,461 | 10/1964 | Johnson | 264—289 |
| 3,359,226 | 12/1967 | Giddings et al. | 106—193 J |
| 3,627,553 | 12/1971 | Clark et al. | 106—193 J |
| 3,694,399 | 9/1972 | Schwartz | 106—193 J |

JAY H. WOO, Primary Examiner

U.S. Cl. X.R.

264—147, 210 R, 288

PO-1050
(5/69)

UNITED STATES PATENT OFFICE
CERTIFICATE OF CORRECTION

Patent No. 3,804,937      Dated April 16, 1974

Inventor(s) Horton H. Morris, et al.

It is certified that error appears in the above-identified patent and that said Letters Patent are hereby corrected as shown below:

Column 1, line 31,    delete "the";

Column 2, line 25,    "OR'''" should be -- OR''' --;

Column 2, line 40,    "CR" should be -- OR --;

Column 2, line 46,    before "page" insert --[see also --;

Column 2, line 58,    after "unknown" insert -- ] --;

Column 5, line 40,    "adn" should be -- and --;

Column 5, line 68,    "usid" should be -- used --;

Column 9, line 3,    "hydroxy" should be -- hydroxyl --.

Signed and sealed this 10th day of September 1974.

(SEAL)
Attest:

McCOY M. GIBSON, JR.
Attesting Officer

C. MARSHALL DANN
Commissioner of Patents